United States Patent [19]

Hurdle, Jr.

[11] Patent Number: 4,772,001

[45] Date of Patent: Sep. 20, 1988

[54] END LOG LIFTER

[76] Inventor: Ennis J. Hurdle, Jr., Hwy. 57 East, Moscow, Tenn. 38057

[21] Appl. No.: 55,994

[22] Filed: Jun. 1, 1987

[51] Int. Cl.⁴ .................................... B23Q 3/00

[52] U.S. Cl. .................................... 269/308; 254/104

[58] Field of Search .................... 83/435.1; 269/56, 53, 269/54, 54.1, 54.2, 54.3, 54.4, 54.5, 71, 308, 309, 310, 234, 217; 198/345; 254/104

[56] References Cited

U.S. PATENT DOCUMENTS

| | | | |
|---|---|---|---|
| 2,633,879 | 4/1953 | Andrus | 269/54.2 |
| 2,723,690 | 11/1955 | Marsh | 269/54.1 |
| 3,071,887 | 1/1963 | Von Arb | 254/104 |
| 3,543,903 | 12/1970 | Lodige | 254/104 |
| 3,603,362 | 9/1971 | Neild | 269/54.2 |
| 3,782,711 | 1/1974 | Montgomery | 269/54.2 |
| 3,799,484 | 3/1974 | Muller et al. | 254/104 |
| 4,532,842 | 8/1985 | McFarlane | 83/435.1 |

FOREIGN PATENT DOCUMENTS

| | | | |
|---|---|---|---|
| 575844 | 4/1924 | France | 269/56 |
| 375255 | 6/1973 | U.S.S.R. | 254/104 |

*Primary Examiner*—Robert C. Watson

*Attorney, Agent, or Firm*—Walker & McKenzie

[57] ABSTRACT

A lifter coupled to a log carriage for lifting one end of a log relative to the log carriage. The lifter includes a base member fixed to the carriage for movement therewith; a support member supporting the end of the log; and a lift mechanism associated with the base member and the support member for lifting the support member between a lowered position and a raised position and for causing the end of the log to be lifted between a lowered position and a raised position.

9 Claims, 3 Drawing Sheets

END LOG LIFTER

BACKGROUND OF THE INVENTION

1. Field of the Invention

The present invention relates, in general, to means for use with sawmills, and the like, for lifting the end of a log opposite the swell butt end thereof as the log is moved through the sawmill on carriage means or the like.

2. Description of the Related Art

A preliminary patentability search in class 83, subclass 435.1 disclosed the following patents: Shapleigh, U.S. Pat. No. 4,307,641; McFarlane, U.S. Pat. No. 4,532,842; and Kaster, U.S. Pat. No. 4,589,320. None of the above patents disclose or suggest the present invention.

SUMMARY OF THE INVENTION

The present invention is directed toward providing a lifter for lifting one end of a log as the log is conveyed through a sawmill or the like.

The lifter of the present invention is coupled to a log carriage of a sawmill, or the like, for lifting one end of a log relative to the log carriage. The lifter includes, in general, a base member fixed to the carriage for movement therewith; a support member supporting the end of the log; and a lift mechanism associated with the base member and the support member for lifting the support member between a lowered position and a raised position and for causing the end of the log to be lifted between a lowered position and a raised position.

DESCRIPTION OF ThE PREFERRED EMBODIMENT

Figure 1:
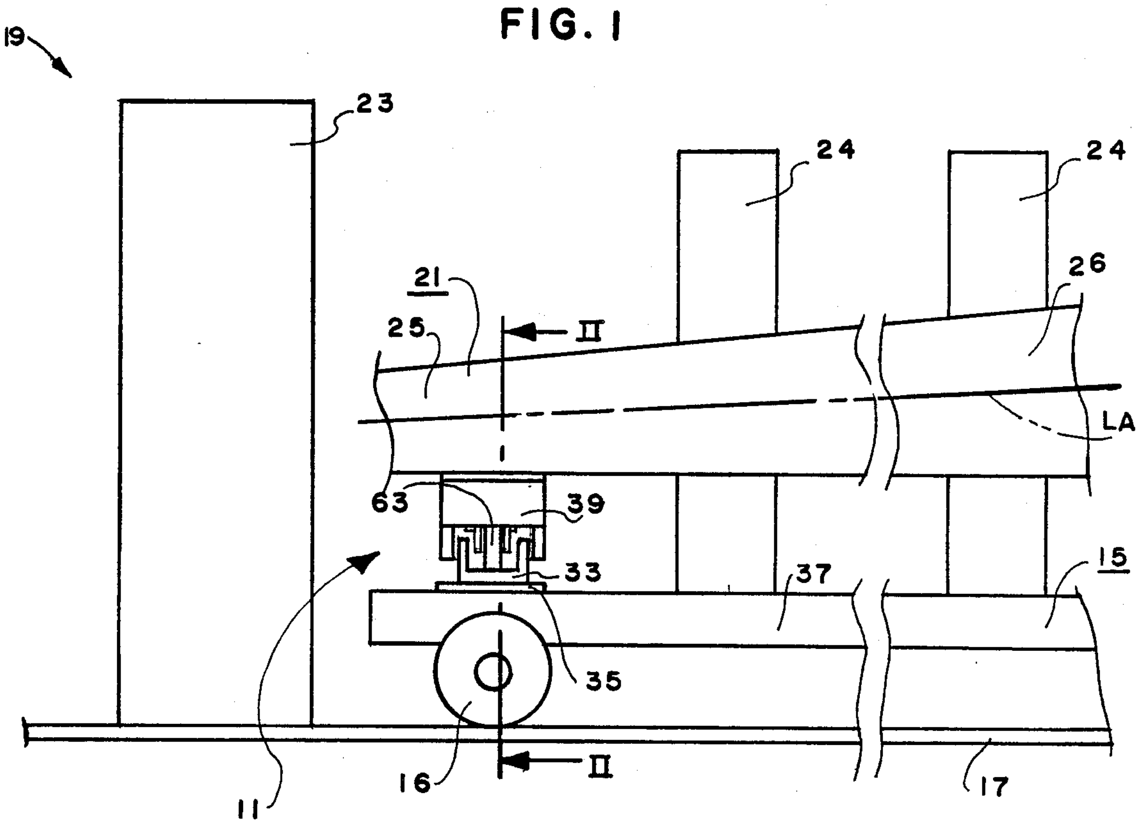
FIG. 1 is a somewhat diagrammatic front elevational view of a sawmill showing the lifter of the present invention associated therwith with the lifter in a lowered position.
Figure 2:
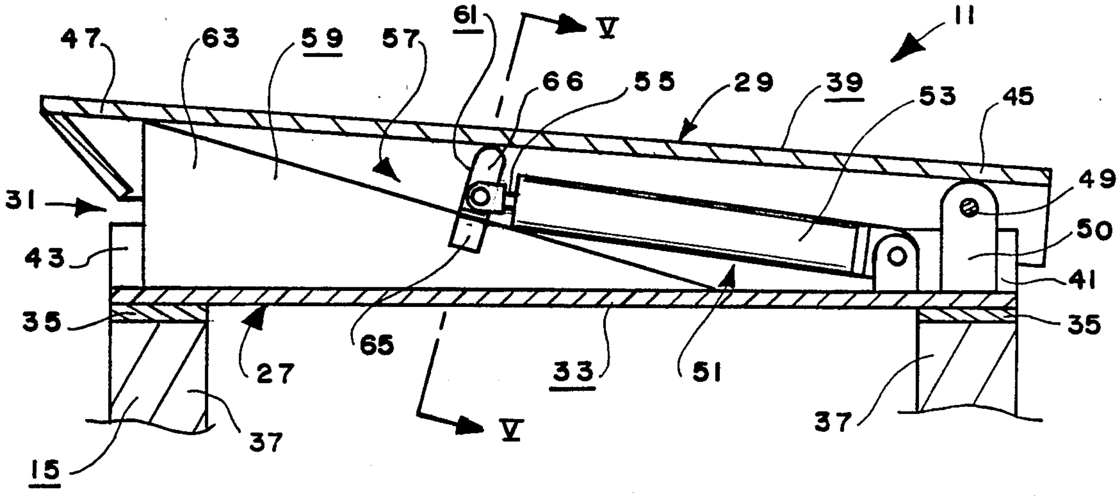
FIG. 2 is an enlarged sectional view substantially as taken on line II—II of FIG. 1 with portions thereof omitted for clarity.

The preferred embodiment of the lifter 11 of the present invention is mounted on the bed of a carriage 15 which is reciprocally movable, via wheels 16, or the like, on track rails 17 of a sawmill 19. As is well known to those skilled in the art, a log 21 is supported on the bed of the carriage 15 for movement past a saw means 23 for making certain saw cuts into the log 21. Typical clamp means 24 are provided for holding the log 21 to the bed of the carriage 15. THe lifter 11 is coupled to the carriage 15 preferably for lifting the end 25 of the log 21 opposite the swell butt end 26 thereof relative to the bed of the carriage 15. The lifter 11 thus positions the log 21 so that the end 25 thereof can be edged true with the grain of the log 21 (see FIG. 3) as will now be apparent to those skilled in the art. More specifically, without the lifter 11 of the present invention, the log 21 would be positioned on the carriage 15 with the grain and the longitudinal axis LA thereof sloping downward from the swell butt end 26 toward the end 25 substantially as shown in FIG. 1. The lifter 11 is used to lift the end 25 so as to position the grain and the longitudinal axis LA of the log 21 substantially parallel with the bed of the carriage 15 as will now be apparent to those skilled in the art.

Figure 3:
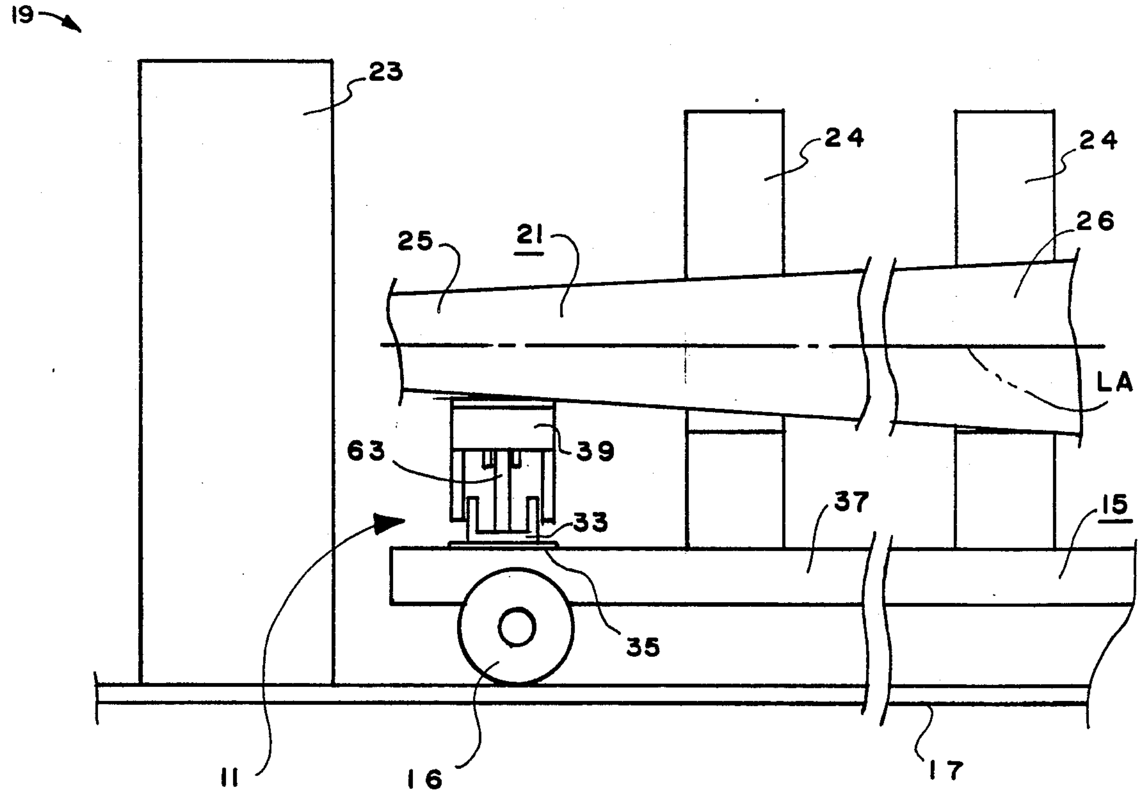
FIG. 3 is a somewhat diagrammatic front elevational view of a sawmill showing the lifter of the present invention associated therewith with the lifter in a raised position.

The preferred embodiment of the lifter 11 includes, in general, a base member 27 for being fixed to the bed of the carriage 15 for movement with the carriage 15, a support member 29 for supporting the end 25 of the log 21, and lift means 31 associated with the base member 27 and the support member 29 for lifting the support member 29 between a lowered position and a number of raised positions and for causing the end 25 of the log 21 to be lifted between a lowered position (see FIG. 1) and a number of raised positions (see FIG. 3).

The base member 27 preferably includes an elongated base beam 33 extending transversely across the bed of the carriage 15. The base beam 33 may consist of a typical metal channel beam secured to the bed of the carriage 15 with the "channel" thereof opening upwardly. The base member 27 may include a pair of metal base plates 35 attached adjacent either end of the base beam 33 and adjacent either side of the bed of the carriage 15. More specifically, the bed of the carriage 15 may be defined in part by a pair of metal longitudinal members 37 and the base plates 35 by welded to the longitudinal members 37 with the base beam 33 welded to the base plates 35 as clearly shown in FIGS. 1–4.

Figure 5:
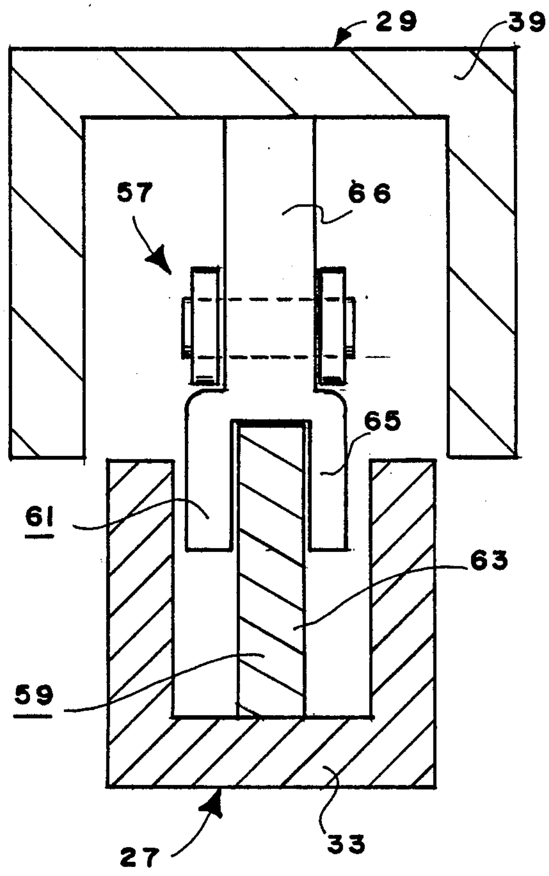
FIG. 5 is an enlarged sectional view substantially as taken on line V—V of FIG. 2.

The support member 29 preferably includes an elongated support beam 39 extending transversely across the bed of the carriage 15. The support beam 39 may consist of a typical metal channel beam located with the "channel" thereof opening downwardly and sized so as to fit over at least a portion of the base beam 33 as clearly shown in FIG. 5.

The support member 29 may be pivotally attached to the base member 27. Thus, the base beam 33 preferably has a first end 41 and a second end 43, the support beam 39 preferably has a first end 45 and a second end 47, and a pivot member 49 is preferably included for pivotally attaching the first end 45 of the support beam 39 to the first end 41 of the base beam 33. The pivot member 49 may consist simply of a shaft member extending through the first end 45 of the support beam 39 and the first end 41 of the base beam 33 to allow the second end 47 of the support beam 39 to pivot from a lowered position adjacent the second end 43 of the base beam 33 (see FIG. 2) to one or more raised positions above the second end 43 of the base beam 33 (see FIG. 4). The first end 41 of the base beam 33 may include an ear member 50, or the like, for receiving the pivot member 49.

Figure 4:
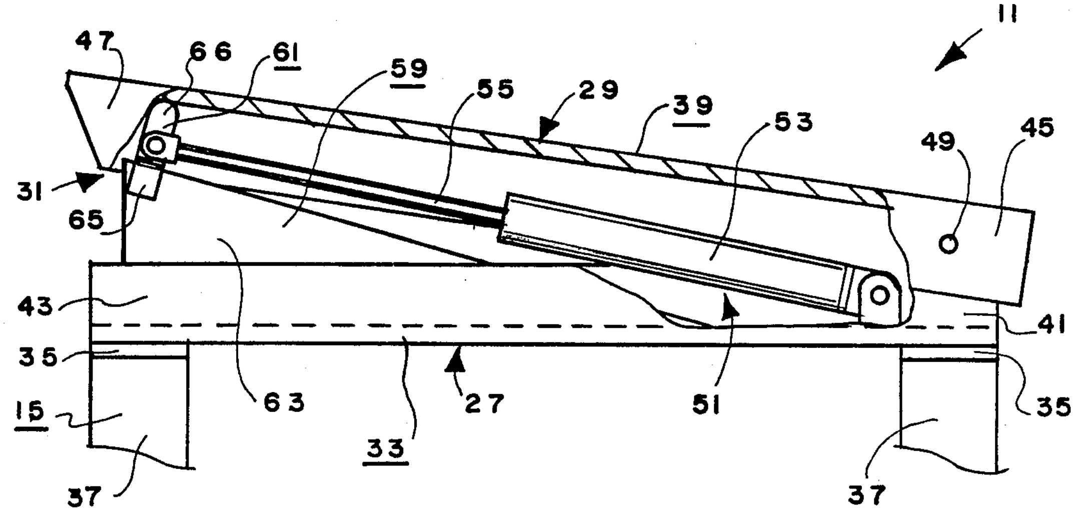
FIG. 4 is a somewhat diagrammatic side elevational view of a portion of FIG. 3 with portions thereof broken away for clarity.

The lift means 31 may consist of various specific mechanisms, such as a vertical piston-cylinder or the like, not shown. Preferably, the lift means 31 includes piston means 51 extending between the base member 27 and the support member 29 for selectively moving the support member 29 from the lowered position shown in FIG. 2 to a raised position as shown in FIG. 4. The piston means 51 preferably includes a piston cylinder 53 mounted to the base member 27 and a piston rod 55 movable between a retracted position (see FIG. 2) and an extended position (see FIG. 4) relative to the piston cylinder 53. The lift means 31 also preferably includes cam means 57 associated with the piston means 51, the base member 27 and the support member 29 for causing the support member 29 to move from the lowered position to a raised position when the piston rod 55 moves from the retracted position to the extended position. The cam means 57 preferably includes a cam member 59 attached to the base member 27 and a cam follower member 61 attached to the piston rod 55 and engaging the support member 29. The cam member 59 preferably includes an inclined plane or wedge 63 fixed to the base beam 33 and inclined upwardly in a direction from the first end 41 of the base beam 33 toward the second end 43 of the base beam 33. The wedge 63 is preferably constructed of metal and welded or otherwise fixedly attached to the base beam 33. The cam follower member 61 preferably includes a U-shaped member 65 for straddling the wedge 63 and for moving upward along the wedge 63 as the piston rod 55 moves from the retracted position to the extended position. The upper end 66 of the U-shaped member 65 engages the underside of the support beam 39 and causes the support beam 39 to move from the lowered position to a raised position as the piston rod 55 moves from the retracted position to an extended position as will now be apparent to those skilled in the art.

Figure 6:
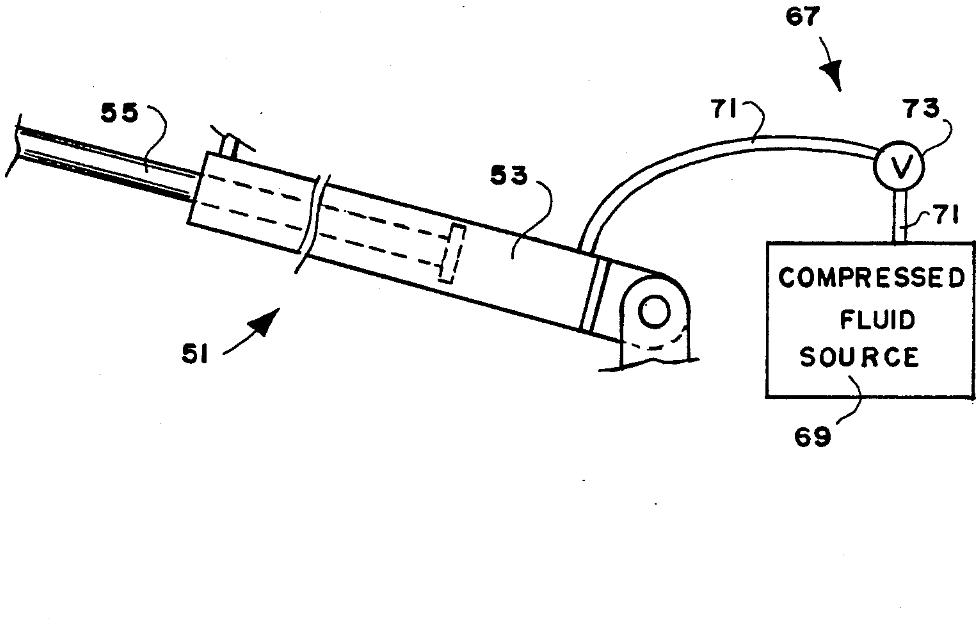
FIG. 6 is a somewhat schematic view of certain components of the lift means of the lifter of the present invention.

A typical control means 67 is preferably coupled to the piston cylinder 53, as will now be apparent to those skilled in the art, to allow the operator of the sawmill 19 to control the piston cylinder 53 and, thus, the raising and lowering of the end 25 of the log 21 in a manner as will now be apparent to those skilled in the art. The control means 67 preferably includes a source 69 of compressed hydraulic or pneumatic fluid, hoses 71 extending from the source 69 of compressed fluid to the piston cylinder 53, and a valve 73 (see FIG. 6).

To use the lifter 11 of the present invention, the log 21 is loaded onto the carriage 15 in any typical manner now apparent to those skilled in the art with the end 25 of the log 21 positioned on the support beam 39. Next, the operator of the sawmill 19, or the like, determines whether the end 25 of the log 21 needs to be lifted relative to the bed of the carriage 15 in order to allow the end 25 of the log 21 to be edged, etc., true to the grain of the log 21 as will now be apparent to those skilled in the art. If it is determined that the end 25 of the log 21 needs to be lifted relative to the bed of the carriage 15, the operator merely opens the valve 73 to cause the piston rod 55 to move to an extended position and cause the cam means 57 to cause the support member 29 to move to a raised position, thereby moving the end 25 of the log 21 to a raised position as will now be apparent to those skilled in the art. After the end 25 of the log 21 has been raised sufficiently, the valve 73 is closed to lock the piston rod 55 (and, thus, the support beam 39 and end 25 of the log 21) in the desired position as will now be apparent to those skilled in the art. The carriage 15 can then be moved through the sawmill 19 in the typical manner. It should be noted that the carriage 15 may be arranged so that the swell butt end 26 of the log 21 enters the saw means 23 before the end 25 (i.e., opposite the manner shown in FIGS. 1 and 3).

Although the present invention has been described and illustrated with respect to a preferred embodiment and a preferred use therefor, it is not to be so limited since modifications and changes can be made therein which are within the full intended scope of the invention.

I claim:

1. A lifter coupled to a log carriage for lifting one end of a log relative to said log carriage, said lifter comprising:

(a) a base member fixed to said carriage for movement therewith;

(b) a support member supporting said end of said log; and (c) lift means associated with said base member and said support member for lifting said support member between a lowered position and a raised position and for causing said end of said log to be lifted between a lowered position and a raised position; said lift means including cam means for causing said support means to move between said lowered and raised positions.

2. The lifter of claim 1 in which said base member has a first end and a second end, in which said support member has a first end and a second end, and in which is included a pivot member pivotally attaching said first end of said support member to said first end of said base member.

3. The lifter of claim 1 in which said lift means includes piston means extending between said base member and said support member for selectively moving said support member from said lowered position to said raised position.

4. The lifter of claim 1 in which said piston means includes a piston cylinder mounted to said base member and includes a piston rod movable between a retracted position and an extended position relative to said piston cylinder.

5. A lifter coupled to a log carriage for lifting one end of a log relative to said log carriage, said lifter comprising:

(a) a base member fixed to said carriage for movement therewith, said base member having a first end and a second end;

(b) a support member supporting said end of said log, said support member having a first end and a second end;

(c) lift means associated with said base member and said support member for lifting said support member between a lowered position and a raised position and for causing said end of said log to be lifted between a lowered position and a raised position; said base member and said support member being elongated and extending transversely across said carriage, said lift means including piston means extending between said base member and said support member for selectively moving said support member from said lowered position to said raised position, said piston means including a piston cylinder mounted to said base member and including a piston rod movable between a retracted position and an extended position relative to said piston cylinder; said lift means including cam means associated with said piston means, said base member and said support member for causing said support member to move from said lowered position to said raised position when said piston rod moves from said retracted position to said extended position; and (d) a pivot member pivotally attaching said first end of said support member to said first end of said base member.

6. The lifter of claim 1 in which said cam means includes a cam member attached to said base member and includes a cam follower member attached to said piston rod and engaging said support member.

7. The lifter of claim 1 in which said cam member includes an inclined plane fixed to said base member and inclined upwardly in a direction from said first end of said base member toward said second end of said base member.

8. The lifter of claim 1 in which said cam follower member includes a U-shaped member for straddling said inclined plane and for moving upward along said inclined plane as said piston rod moves from said retracted position to said extended position.

9. A lifter coupled to a log carriage for lifting the end of a log opposite the swell butt end thereof relative to said log carrige, said lifter comprising:

(a) a base member fixed to said carriage for movement therewith, said base member being elongated and extending across said carriage, said base member having a first end and a second end;

(b) a support member supporting said end of said log, said support member being pivotally attached to said base member, said support member being elongated and extending transversely across said carriage, said support member having a first end and a second end;

(c) a pivot member pivotally attaching said first end of said support member to said first end of said base member; and (d) lift means associated with said base member and said support member for lifting said support member between a lowered position and a raised position and for causing said end of said log to be lifted between a lowered position and a raised position; said lift means including piston means extending between said base member and said support member for selectively moving said support member from said lowered position to said raised position; said piston means including a piston cylinder mounted to said base member and including a piston rod movable between a retracted position and an extended position relative to said piston cylinder; said lift means including cam means associated with said piston means, said base member and said support member for causing said support member to move from said lowered position to said raised position when said piston rod moves from said retracted position to said extended position; said cam means including a cam member attached to said base member and including a cam follower member attached to said piston rod and engaging said support member; said cam member including an inclined plane fixed to said base member and inclined upwardly in a direction from said first end of said base member toward said second end of said base member; said cam follower member including a U-shaped member for straddling said inclined plane and for moving upward along said inclined plane as said piston rod moves from said retracted position to said extended position.

* * * * *